E. H. FORDTRAN.
Insect Destroyer.
No. 196,211.  Patented Oct. 16, 1877.
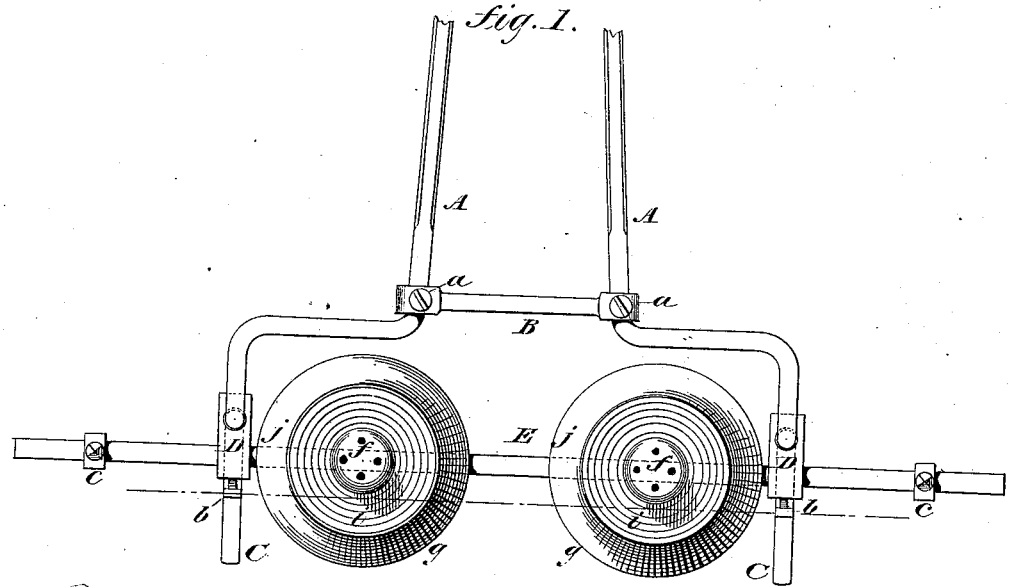
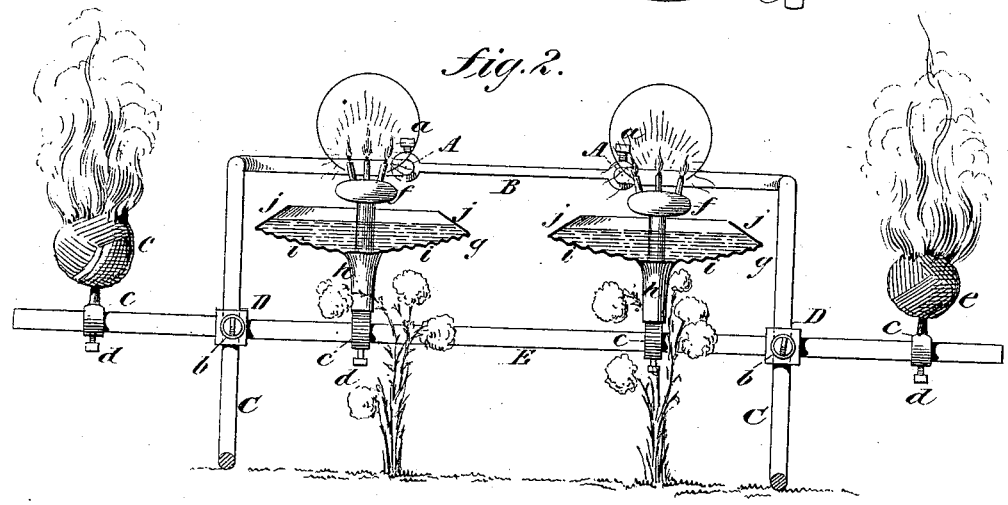
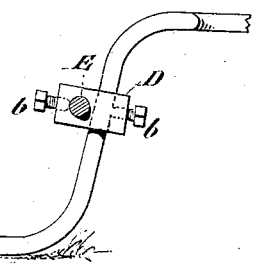
WITNESSES:
Gustave Dietrich
Alex F. Roberts
INVENTOR:
E. H. Fordtran
BY Munn & Co
ATTORNEYS.

UNITED STATES PATENT OFFICE.

EUGENE H. FORDTRAN, OF FLATONIA, TEXAS.

IMPROVEMENT IN INSECT-DESTROYERS.

Specification forming part of Letters Patent No. 196,211, dated October 16, 1877; application filed October 3, 1877.

*To all whom it may concern:*

Be it known that I, EUGENE H. FORDTRAN, of Flatonia, in the county of Fayette and State of Texas, have invented a new and Improved Device for Destroying Insects, of which the following is a specification:

Figure 1 is a plan view of my improved device. Fig. 2 is a rear view, partly in section. Fig. 3 is a detail view of the runner.

Similar letters of reference indicate corresponding parts.

My invention consists in a frame having shafts for receiving a horse, and provided with a horizontal bar, upon which are placed torches and traps of peculiar form.

The rear ends of the shafts, which are elongated and curved, form runners for supporting the horizontal bar at such a height as to agitate the tops of the plants over which the device is drawn.

In the drawings, A A are shafts formed of iron rods or tubing, and connected by a cross-bar, B, which embraces both shafts, and is provided with set-screws $a$ for clamping the shafts securely in the required position.

The shafts are bent outward at right angles at the rear of the cross-bar B, and are bent backward and downward on a reversed curve, forming runners C, which support the various parts of the apparatus, and may be easily drawn over the ground.

Upon the vertical portion of these runners blocks D are placed, in which two holes are bored at right angles to each other—one for receiving the runner and the other for receiving the horizontal bar E. The blocks D are provided with set-screws $b$ for clamping the runner and the horizontal bar.

Standards $c$, having suitable eyes and provided with set-screws $d$, are placed on the horizontal bar E, and clamped in the required position.

The upper ends of these standards are sharpened and barbed, and upon them either balls $e$, of fibrous material, which have been previously saturated with inflammable material, or a lantern, $f$, and trap $g$, are placed.

The lantern $f$ and trap $g$ are both attached to a tubular standard, $h$, the lantern being attached to the upper end of the standard, and the trap $g$ being placed below it. The lantern $f$ consists of a simple oil-lamp having a number of wick-tubes, and provided with a glass globe for protecting the flame; and the trap $g$ consists of a concave pan, $i$, having annular concentric corrugations and an inwardly-inclined rim, $j$.

The pan $i$ is arranged concentrically in relation to the lantern, so that insects attracted by the light, after striking the globe of the lantern, drop into the trap, and are killed by the liquid contained therein.

In destroying some kinds of insects the saturated inflammable ball only will be required.

I do not confine myself to any particular number of torches, traps, or inflammable balls, nor to the special form of support for the bar E, as these may be varied to suit circumstances.

The device is designed, principally, for destroying the insects which infest and ruin the cotton-plant; but it is equally effectual in destroying many other insects.

The manner of using the device is as follows: The bar E is adjusted at a suitable height to touch and agitate the tops of the plants as it is drawn over the rows. The insects, being thus disturbed, are attracted by the light of the lantern or burning ball, and, flying into the flame, are injured or destroyed.

In case the lantern and trap are employed, the trap is partly filled with kerosene-oil, and the insects, being attracted by the flame, fly against the globe and fall into the oil, and are instantly killed.

The inwardly-projecting rim of the trap prevents the oil from being thrown out by the jarring of the pan, and the corrugations in the pan increase the friction of the oil on the bottom, so that it is not easily thrown from side to side.

Having thus described my invention, I claim as new and desire to secure by Letters Patent—

1. The shafts A C, constructed and connected by a bar, B, as shown and described, in combination with a cross-bar, E, made fast at a distance above the runners, to brush against the plants and support the traps, as set forth.

2. The combination of the adjustable standards $c$ with bar E, and a supporting and carrying device, substantially as herein shown and described.

EUGENE H. FORDTRAN.

Witnesses:
C. SEDGWICK,
ALEX. F. ROBERTS.